(12) United States Patent
Riddell

(10) Patent No.: US 6,386,858 B1
(45) Date of Patent: May 14, 2002

(54) TAKE-OUT ASSEMBLY FOR BLOW MOLDING MACHINE

(75) Inventor: Harold H. Riddell, Collierville, TN (US)

(73) Assignee: Ring Can Corporation, Oakland, TN (US)

( * ) Notice: Subject to any disclaimer, the term of this patent is extended or adjusted under 35 U.S.C. 154(b) by 27 days.

(21) Appl. No.: 09/590,561

(22) Filed: Jun. 9, 2000

(51) Int. Cl.$^7$ .......................... B29C 49/36; B29C 49/70
(52) U.S. Cl. .................. 425/537; 198/750.12; 425/540
(58) Field of Search .................. 425/537, 540, 425/215; 198/407, 750.12, 750.14, 803.5

(56) References Cited

U.S. PATENT DOCUMENTS

| | | | |
|---|---|---|---|
| 3,066,787 A | | 12/1962 | Allgeyer |
| 3,587,816 A | * | 6/1971 | Russell et al. |
| 3,907,095 A | * | 9/1975 | Russell et al. |
| 3,949,860 A | | 4/1976 | Bilodeau |
| 3,981,667 A | * | 9/1976 | Bilodeau |
| 4,069,002 A | * | 1/1978 | Seelye .................. 425/540 |
| 4,213,750 A | * | 7/1980 | Kubota et al. ............ 425/537 |
| 4,752,206 A | | 6/1988 | Nowicki et al. |
| 4,795,124 A | | 1/1989 | Nagai |
| 4,834,643 A | | 5/1989 | Klinedinst et al. |
| 4,902,217 A | | 2/1990 | Martin et al. |
| 5,049,061 A | * | 9/1991 | Billoud .................. 425/540 |
| 5,156,798 A | | 10/1992 | Bruning |
| 5,297,950 A | | 3/1994 | Kresak |

FOREIGN PATENT DOCUMENTS

FR           772264    *  3/1972   ................ 425/537

OTHER PUBLICATIONS

Sketch X.

* cited by examiner

Primary Examiner—Robert Davis
(74) Attorney, Agent, or Firm—David A. Tamburro

(57) ABSTRACT

A rotary blow molding machine comprising a rotatable wheel, a plurality of mold assemblies mounted on the wheel in circumferentially spaced apart relation, each of said mold assemblies being openable to expose a finished workpiece as the mold assembly moves through a workpiece discharge station. A take-out assembly removes a finished workpiece from a mold assembly as the mold assembly moves through said discharge station, the take-out assembly including a first transfer mechanism mounted adjacent said discharge station and including a first pick-up unit for grasping a finished workpiece and moving it in a substantially linear direction upwardly away from said wheel to a transfer station. A second rotary transfer mechanism is mounted at the transfer station for receiving a workpiece from the first pick-up unit and moving the workpiece to an exit station as the first pick-up unit returns to the discharge station to pick up another finished workpiece from the wheel.

9 Claims, 5 Drawing Sheets

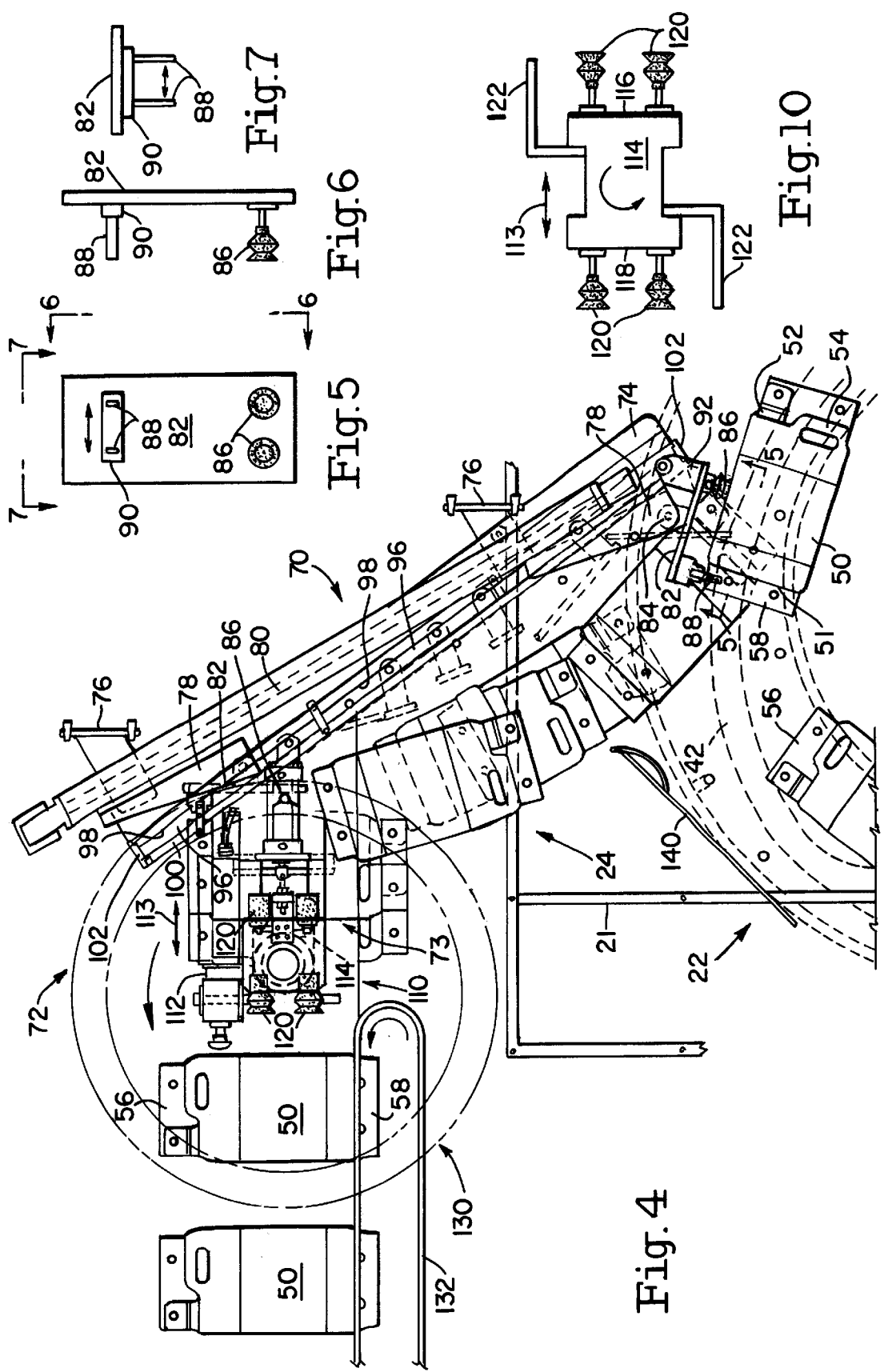

Fig. 8

TAKE-OUT ASSEMBLY FOR BLOW MOLDING MACHINE

BACKGROUND OF THE INVENTION

This invention relates generally to blow molding machines and more particularly to a take-out assembly for removing a blown article such as a plastic bottle from a mold assembly on the machine and transferring it to a material-handling conveyer.

Blow molding machines are used to produce various types of articles and have been found to be particularly useful in making plastic bottles containing various types liquids such as cooking oils, beverages, household chemicals, etc. The machines operate by extruding into a mold cavity a parison of plastic material which is heated to a semifluid state, and then is subsequently subjected to internal pressurization through an inserted needle causing the plastic to inflate and conform to the inside surfaces of the mold cavity.

A popular type of blow molding machine includes a rotary wheel or turntable, which rotates about a horizontal axis. The wheel has a number of multi-piece, openable and closeable mold assemblies circumferentially spaced therearound. The wheel is rotated past a number of work stations, at a first work station the mold parts are separated to expose the mold cavity and, as the parts arrive at or pass a discharge nozzle of a plastic extruder, the cavity is charged with the heated plastic parison. That mold assembly is then clamped together and rotated to the next work station where a fluid such as air is injected into the mold to cause the parison charge to expand and conform to the inside configuration of the mold cavity. As the wheel continues to rotate, the mold assembly is cooled, thereby causing the plastic material to solidify. At a final discharge workstation, the mold assembly is opened and the finished plastic bottle is removed by a take-out assembly.

A production capacity is determined by the number of blow mold assemblies located around the circumference of the wheel, the speed of rotation of the wheel, and the rate at which the take-out assembly is capable of removing finished bottles from the rotating wheel.

In the past, take-out assemblies have been of rather complex construction and quite often have been unable to operate fast enough to permit the blow molding wheel to be operated at its maximum production capacity. Thus, the cost of producing the finished plastic articles has been unnecessarily compromised.

SUMMARY OF THE INVENTION

The primary object of this invention is to provide a blow molding machine of the rotary wheel type having a plurality of mold assemblies spaced around the circumference thereof, and a take-out assembly located adjacent a discharge station of the rotary wheel, the take-out assembly being of simple, economical, but yet reliable construction capable of operating at a capacity sufficient to enable the rotary wheel to function at its maximum designed production speed.

The novel take-out assembly of the invention accomplishes the above objective by providing a first substantially linear or large radius curved transfer mechanism which removes a finished bottle from a mold assembly at the discharge station of the rotating wheel and transfers that finished bottle upwardly along substantially a straight line to a second separate rotary transfer mechanism which receives the bottle from the first mechanism, rotates the bottle through 1800 into an upright position, and then places the upright bottle onto an exit transfer conveyer. The overall pickup assembly is capable of operating at higher speeds because once a finished bottle is transferred from the first mechanism to the second mechanism, the first mechanism may quickly return to the discharge station of the wheel to pick-up a finished bottle from the next mold assembly presenting itself on the wheel. During the return stroke of the first pick-up mechanism, the second rotary transfer mechanism places the first bottle onto the exit transfer conveyer and subsequently returns to its initial handoff position ready to receive the next bottle from the first linear transfer mechanism.

The novel take-out assembly of the invention has been especially adapted for use with a blow molding machine having an approximately fifty-three inch (53") pitch diameter wheel with five mold assemblies positioned around the circumference thereof and capable of producing large blown plastic bottles, for example of a two and one half gallon size (4½" wide×9" long×15" high) or thirty-five pound size (16" high×9⅜" square) capable of producing about twenty-five bottles per minute (25 bpm). The first linear transfer mechanism moves a finished bottle away from the wheel, so that the wheel may continue to rotate, along substantially a straight line through a distance of about forty-six inches to a handoff station where it is handed off to the second rotary mechanism which rotates on a radius of about twenty-four inches to place the finished bottles on the exit conveyer. Advantageously, the novel take-out mechanism of the invention is capable of operating at at least twenty-five bpm, the maximum capacity of the blow molding wheel.

In operation, as the wheel rotates into the take-out position at the final discharge station, the mold is opened, knockouts in the mold eject the bottle from the mold and place it on the wheel's centerline ready for pickup. The first linear transfer mechanism picks up the bottle with a combination of vacuum cups and grippers and moves the bottle along a substantially straight line to a handoff station located about three feet upwardly away from the wheel. The first mechanism pulls the bottle out of the way of the wheel so that the wheel may continue to cycle. During the linear transfer of the bottle, the bottle is rotated by a cam, track or actuator (pneumatic cylinder), so that when it reaches the handoff station the bottle is in the proper bottom up vertical orientation ready for handoff. At the handoff station, the second rotary transfer mechanism employs a head assembly with vacuum cups and/or grippers, the head assembly being first extended to grab the bottle from the first mechanism and then slightly retracted so that the first mechanism can repeat the bottle pick up cycle without interference from the second rotary mechanism. The rotary transfer mechanism then rotates the bottle through one hundred and eighty degrees to orient the bottle right side up. The head assembly is then again extended to place the bottle on the linear transfer conveyer. Alternatively, the head assembly may be extended as it is rotated. Subsequently, the head assembly is retracted to clear the conveyer and permit the rotary mechanism to rotate without interference. Operation of the first and second mechanisms is timed so that each is able to operate at sufficient speed and to cooperate with each other so that finished bottles may be removed from the rotary wheel at a speed sufficient to permit the rotary wheel to operate at its maximum designed capacity.

As an added advantageous feature of the novel take-out assembly, the pick up device of the first linear mechanism includes both vacuum cups and mechanical grippers, the vacuum cups normally engaging the finished blown bottle and performing the transfer operation out of the mold to the handoff station. However, if a miss blow occurs the mechanical grippers will still pick up the parison and transfer it out of the mold. At the handoff location, the second rotary transfer mechanism only has vacuum cups that cannot pick up a miss blown pan son. Therefore, when the mechanical grippers of the first mechanism release the parison, the parison is dropped and falls onto a slide which directs the miss blown parison away from the machine without causing any handling or jamming problems of the machine.

These and other objects of the invention will become apparent from reading the following description of the invention wherein reference is made to the accompanying drawings.

BRIEF DESCRIPTION OF THE DRAWINGS

FIG. 4 is an enlarged schematic illustration of the part take-out system of FIG. 1 showing the path traveled by the bottle as it is removed from the rotary blow-molding machine and placed onto an exit transfer conveyer.

FIG. 5 is a fragmentary schematic view taken along 5—5 of FIG. 4 illustrating the front face of the pick up head which forms part of the linear transfer mechanism of the take-out system.

FIG. 6 is a fragmentary side view taken along line 6—6 of FIG. 5.

FIG. 7 is a fragmentary top view taken along line 7—7 of FIG. 5.

FIG. 8 is a fragmentary bottom perspective view taken generally along line 8—8 of FIG. 4 and illustrating the part take-out system including the linear transfer mechanism and the rotary hand of mechanism which cooperate to move the bottle tom the rotary blow-molding machine to the discharge exit conveyer.

FIG. 10 is a simplified top plan view of the rotary transfer mechanism taken along line 10—10 of FIG. 4.

DETAILED DESCRIPTION OF THE INVENTION

Figure 1:
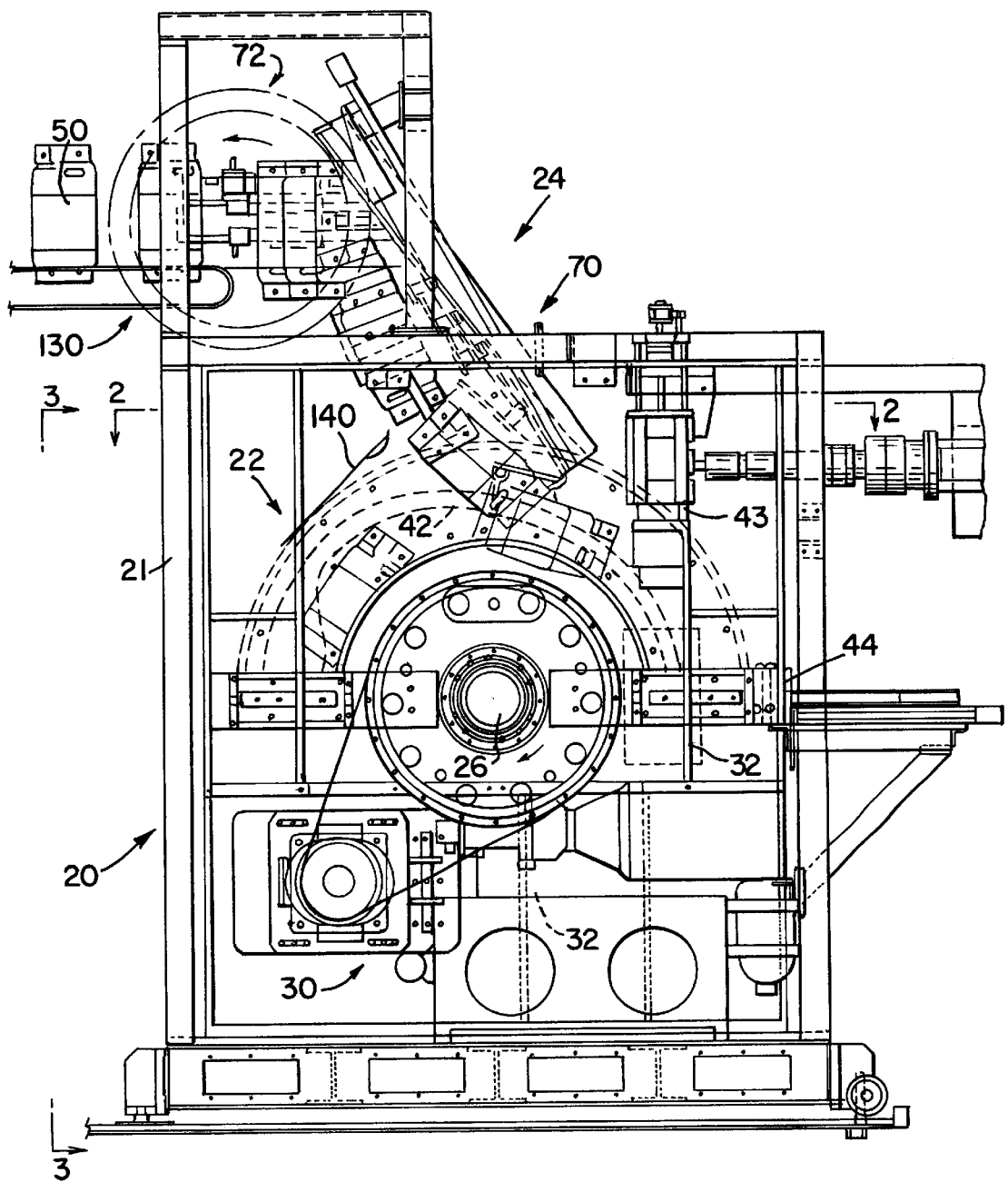
FIG. 1 is a fragmentary front side elevational view illustrating a conventional blow-molding machine which incorporates the novel part take-out system of the invention.
Figure 2:
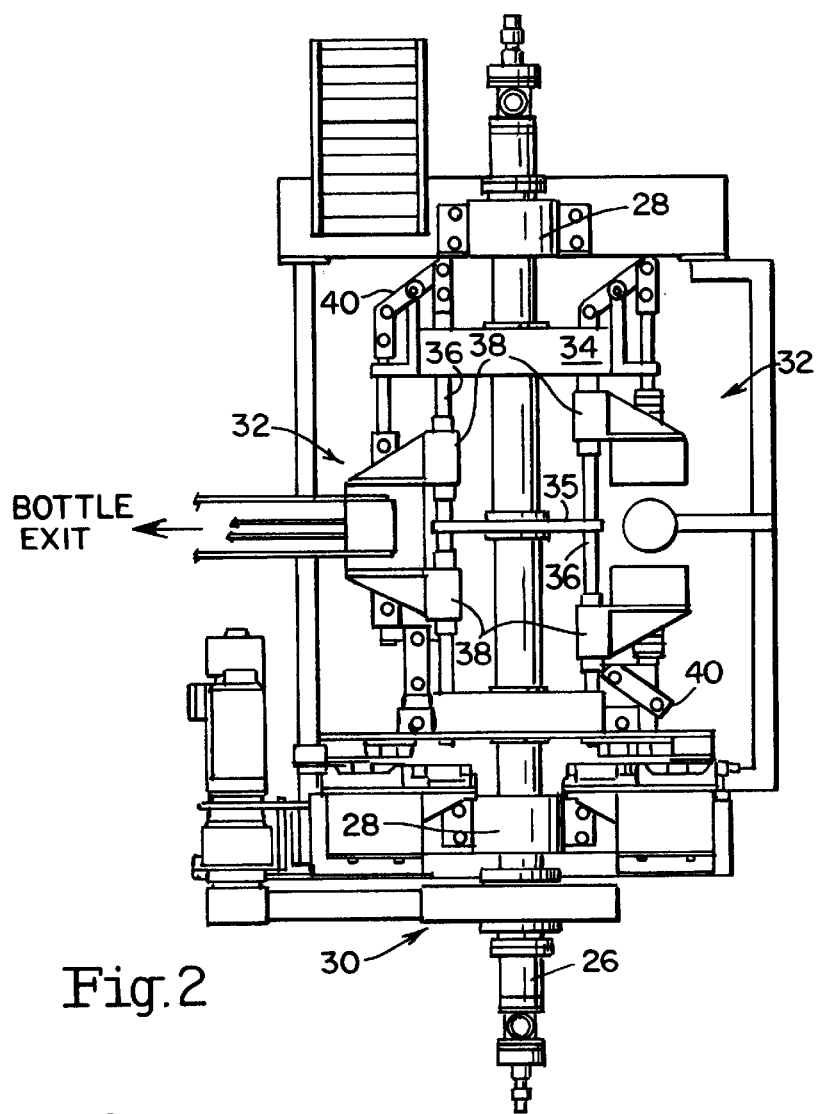
FIG. 2 is a top plan view of the rotary blow-molding machine taken along line 2—2 of FIG. 1 generally illustrating the rotary wheel.
Figure 3:
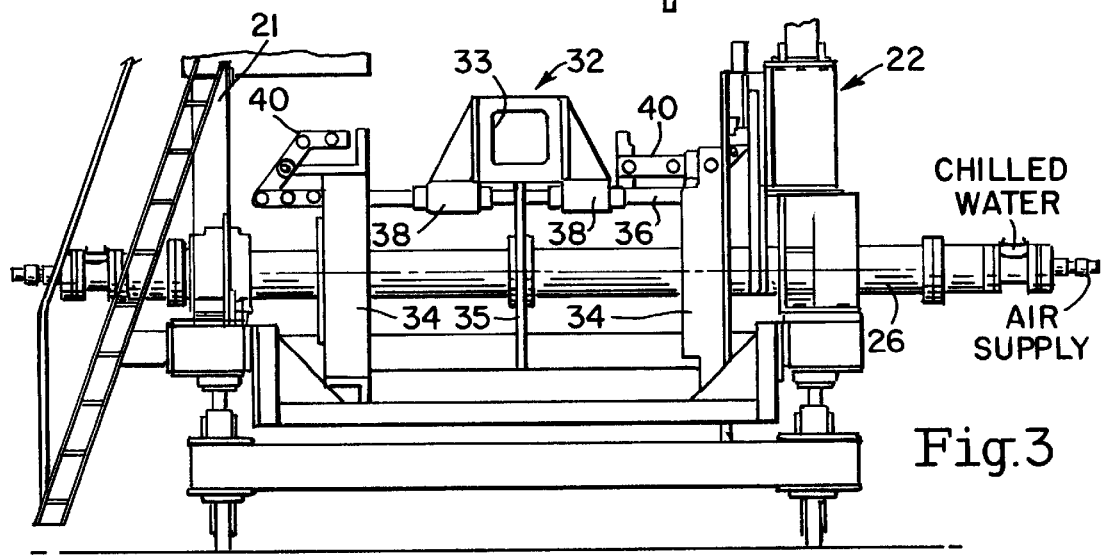
FIG. 3 is a fragmentary end view of the blow-molding machine taken along line 3—3 of FIG. 1 and schematically illustrating the novel part take-out system of the invention.
Figure 9:
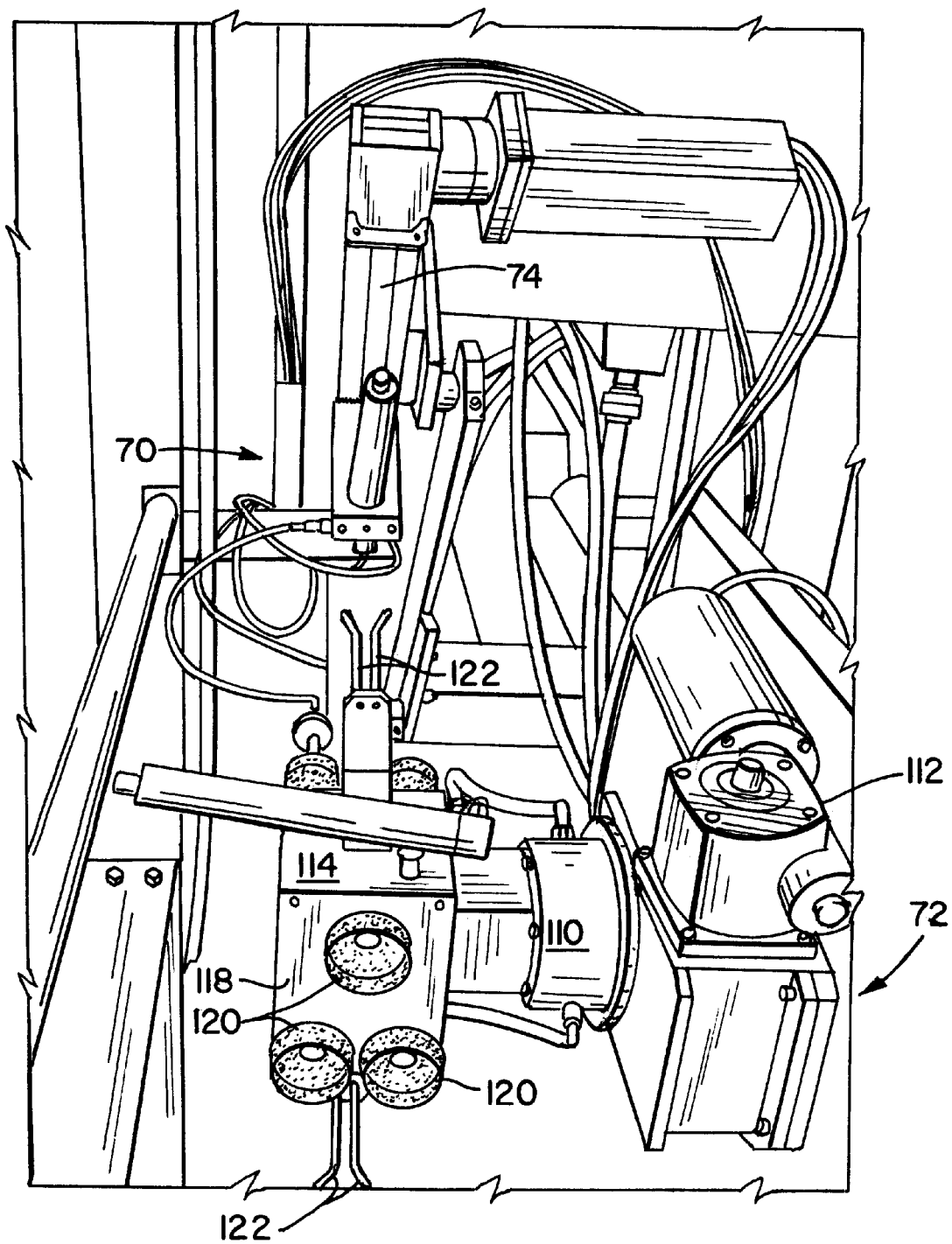
FIG. 9 is a schematic end perspective view taken along line 9—9 of FIG. 4 and illustrating the rotary hand off mechanism and its servo operating system.

FIGS. 1 to 3 illustrate a blow-molding machine 20 having a frame 21, a generally conventional blow molder wheel assembly 22 and a novel part take-out assembly 24 constructed according to the invention, both mounted on frame 21.

Blow molder wheel assembly 22 includes a horizontal shaft 26 rotatably mounted within bearings 28 and intermittently rotated by a suitable drive unit 30. A plurality of separable, two-part mold assemblies 32 (e.g. five) are equally circumferentially mounted around shaft 26 via spaced collars 34 and central ring 35 fixed on the shaft and rods 36 extending between the collars and through ring 35.

Each half of mold assemblies 32 includes a tubular socket 38 which is slidably mounted on rods 36 to permit the mold assemblies to be opened via cam 42 and closed via hydraulic actuator 44.

During the production cycle, as wheel 22 intermittently rotates clockwise, segments of hot molten plastic from an extrusion nozzle 43 are deposited within the opened mold assemblies 32 which occurs at about the two-o'clock rotated position of the wheel as shown in FIG. 1. After the molten parison is deposited within mold cavity 33 of a mold assembly 32, the mold assembly is closed and air is blown into the parison via an inflation pin to expand the parison until it conforms to the internal surfaces of cavity 33 which defines the final configuration of the workpiece or part, which as illustrated is a large rectangular bottle 50 with a spout 52, handle 54, flash portion 56 at the top center of the bottle, and flash portion 58 at the bottom center of the bottle.

During continued rotation of the wheel, the mold assembly is cooled to cause the plastic material to solidify. At approximately the ten-o'clock rotated position of FIG. 1, cooperating action between cam 42 and linkages 40 opens the mold assembly to expose the bottle 50. As the mold assembly indexes to the one-o'clock position, part knockouts actuate to hold the bottle at approximately one-o'clock position of the vertical center line of wheel 22 for pick up by the bottle take-out assembly 24. Once the part take-out grabs the bottle, the knockouts retract. The bottle is removed from the mold assembly in a slightly upwardly inclined bottom up orientation. The next cycle for that opened mold assembly begins again as described above.

As mentioned above, the generally described construction and operation of wheel 22 is conventional. The pitch diameter of the wheel of an actual machine is about fiftythree inches, the wheel includes five mold assemblies 32 capable of molding large plastic bottles such as a 2½ gallon bottle (15" high×4½ wide×9" long) or a nearly five gallon bottle (16" high×9⅜" square), and the wheel can be rotated at a speed of five (5) rpm to produce 25 bottles per minute (bpm). As discussed initially, prior part take-out assemblies have been incapable of reliably removing bottles from the wheel at its maximum production rate of 25 bpm, and it was necessary to run the wheel at a lower speed, thus reducing the production rate of the machine.

The novel part take-out assembly 24 of the invention was developed to overcome that problem, thus enabling the wheel to be operated at its maximum capacity of 25 bpm.

As shown in FIGS. 1 and 4, the part take-out assembly 24 includes linear transfer mechanism 70 and rotary transfer mechanism 72. Mechanism 70 includes a straight stationary track assembly 74 fixed to the frame 21 by brackets 76 and extending upwardly from wheel 22 at an angle of about 60° at about the 12:30 o'clock position. A slide plate 78 is slidably mounted on track assembly 74 for up and down movement and is driven by a servo mechanism 80. A pick up plate 82 (FIGS. 4–8) is pivotally connected at 84 to the lower end of slide plate 78. A pair of pneumatic suction cups 86 are mounted on the front face of plate 82 at its lower end and a pair of mechanical grippers 88, opened and closed by solenoid 90, are mounted on the upper end of plate 82. A bar 92 extends rearwardly from a lower corner of plate 82 and a cam roller 94 is attached thereto, the cam roller riding in a cam slot 96 formed by the front edge 98 of track 74 and an elongated bar 100 spaced therefrom by strips 102.

As shown schematically in FIGS. 1 and 4, when slide plate 78 is at the bottom of track 74, lift plate 82 is nearly horizontal but angled upwardly at a small acute angle, substantially parallel to the slightly upwardly inclined angle of bottle 50 at the discharge station of wheel 22. The bottle is ejected from the open mold assembly at the discharge station in a bottom up orientation so that suction cups 86 engage against the front wall of the rectangular bottle and grippers 88 pinch against opposite sides of the central flashing strip 58 formed on the bottom 51 of the bottle. As plate 78 is moved upwardly in a straight line along track 74, cam roller 94 rides in cam slot 96 which is configured so that plate 82 rotates about pivot 84 from its near horizontal orientation at which it picks up the bottle from wheel 22 to a substantially vertical orientation at its raised position at the upper handoff station 73. As this occurs, bottle 50 travels upwardly in a substantially straight line, but it is also turned so that it is in a bottom up, vertical orientation when it reaches the handoff station 73 in readiness for transfer to the rotary transfer mechanism 72.

Rotary transfer mechanism 72 includes a rotary head assembly 110 (FIGS. 1, 4, 8, 9, and 10) mounted via servo mechanism 112 on frame 21 adjacent the upper end of mechanism 70 for counter clockwise rotation about an axis parallel to the axis of rotation of shaft 26 and for back and forth horizontal movement (arrow 113) along a line parallel to horizontal diametrical line of rotary wheel 22. Head assembly 110 includes an outer transfer portion 114 having opposite vertical end faces 116 and 118 each provided with pneumatic suction cups 120. A pair of spaced, horizontal support rods 122 extend outwardly beyond each face 116 and 118.

Figure 8:
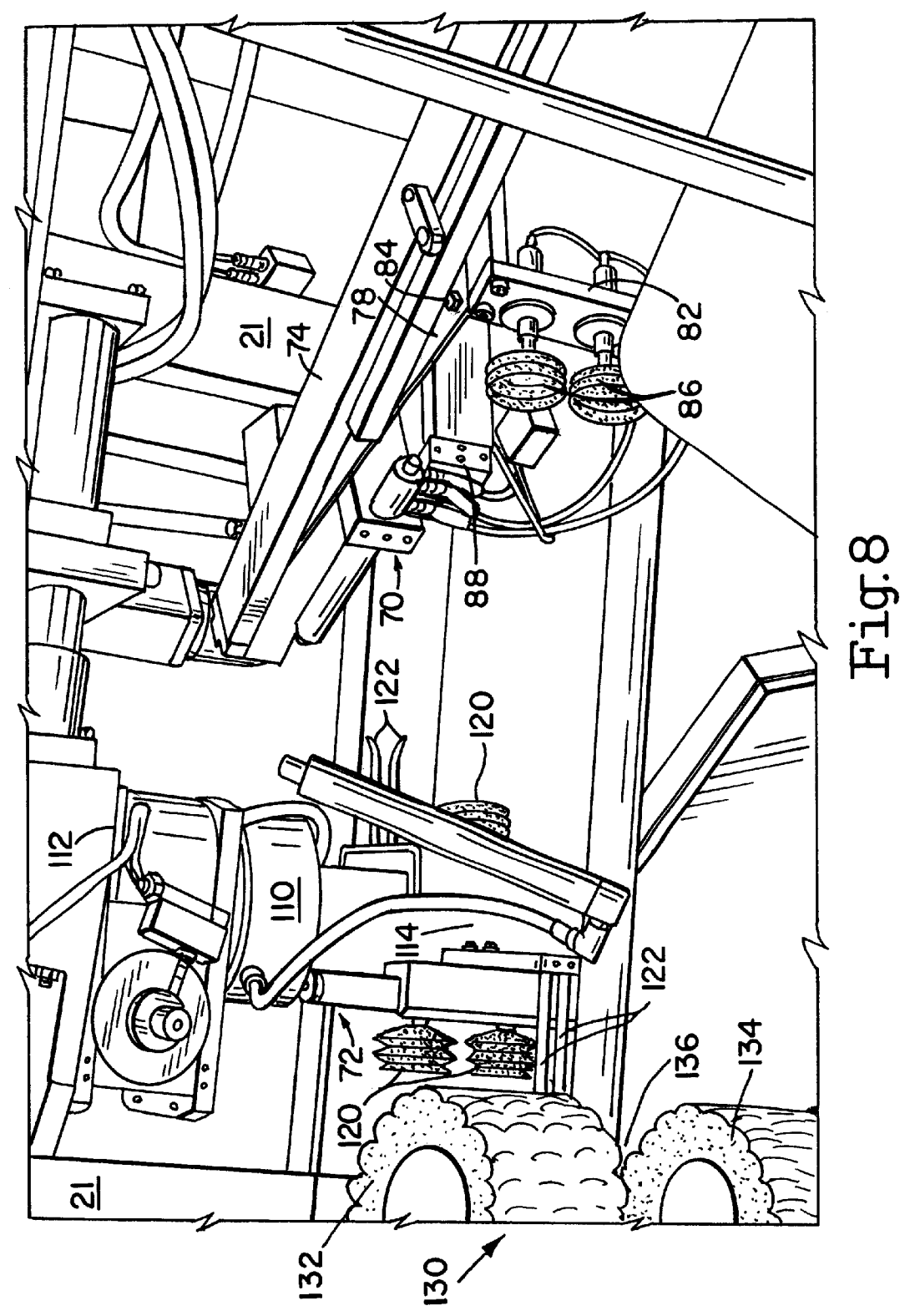

As seen in FIGS. 1, 4, and 8, a horizontal discharge conveyer assembly 130 is mounted adjacent the left discharge end of head portion 114, with conveyer assembly being formed by two parallel conveyer lines 132 and 134 separated by space 136.

In summary, machine 20 operates as follows:

As wheel 22 rotates clockwise and a mold assembly 32 reaches the approximate ten o'clock rotated position of FIG. 1, cam 42 and linkages 40 open that mold assembly to expose the bottle 50. As that mold assembly rotates past the twelve o'clock position, part knock-outs within that assembly extend to eject the bottle and discharge the bottle approximately on the vertical center line of wheel 22 with the bottle in a slightly upwardly inclined bottom up orientation. As illustrated schematically in FIG. 4, with slide plate 78 in its lowermost position, pick-up plate 82 under the action of cam roller 94 and cam slot 96 is in a near horizontal, slightly upwardly inclined position corresponding to the position of bottle 50 being ejected so that suction cups 86 engage against the front wall of bottle 50 and the mechanical grippers 88 pinch the flashing strip 58 on the bottom wall 51 of the bottle. The part knockouts then retract. Servo mechanism 80 then quickly moves slide plate 78 upwardly along track 74 thereby quickly removing bottle 50 away from the path of rotation of turntable 22 up to the bottle handoff station 73. The bottle travels upwardly along a substantially linear path generally parallel to track 74. However, as slide 78 moves upwardly, pick-up plate 82 pivots counterclockwise about the pivot point 84 under the action of cam roller 94 and slot 96 so that the bottle 50 is turned from its slightly inclined orientation at the discharge station of wheel 22 to a substantially vertical, upright bottom-up orientation at hand off station 73. When plate 82 and bottle 50 reach the hand off station 73, rotary head assembly 110 of rotary transfer mechanism 72 is extended horizontally from a center position by a pneumatic cylinder 112 toward bottle 50 (to the right in FIGS. 1 and 4) so that suction cups 120 engage against the back wall of bottle 50 to grasp the bottle as suction cups 86 and grippers 88 are released therefrom. Rotary head assembly 110 is then returned horizontally back to its center position, moving bottle 50 away from plate 82 and providing clearance between the bottle and suction cups 86 and grippers 88 so that slide plate 78 and pick up plate 82 can be rapidly returned downwardly along track 74 adjacent the discharge station of wheel 22 to pick up the next bottle 50 from the next mold assembly 32 on turntable 22. Simultaneously therewith, servo mechanism 112 rotates head assembly 110 in a counterclockwise fashion through 180°, thereby rotating bottle 50 from its bottom up orientation to a bottom down upright orientation (on the left side as shown in FIG. 4). The head assembly 110 is then again extended slightly to the left to place the bottom 51 of the bottle on the spaced conveyor lines 132 and 134 with the flashing 58 on the bottom of the bottle positioned within the space 130. Suction cups 120 are then released from bottle 50 and the head assembly 110 is retracted back to its center line position and the suction cups 120 on the opposite face 118 of head portion 114 are positioned at the hand off station 73 ready to receive the next bottle 50 from pick up plate 82. The spaced fingers 122 are mounted on head portion 114 so that they are positioned to engage against the bottom 51 of each bottle straddling the bottom flashing 58 and helping to support the bottle as the bottle is rotated through 180° from its bottom up orientation at hand off station 73 to its bottom down upright orientation at the discharge conveyor assembly 130.

Drive unit 30, servo mechanism 80, and servo mechanism 112 are operated in synchronism so that wheel 22 can be rotated at its maximum speed to produce 25 bottles per minute, in contrast to the 20 bottles per minute limited by the prior art take-out mechanisms. This substantial increase in production is attributable to the fact that the linear transfer mechanism 70 is separate from the rotary transfer mechanism 72 and once one bottle 50 is handed off from pickup plate 82 to the rotary head assembly 110, the pick up plate 82 is quickly returned down to the discharge station of wheel 22 to pick up the next bottle 50. Simultaneously with that movement, rotary head assembly 110 rotates the first bottle from the hand off station 73 to the discharge conveyor 130 so there is no time lost due to independent operation of the linear transfer mechanism 70 and the rotary transfer mechanism 72.

The linear transfer mechanism 70 and the construction of pick up plate 82 which includes the suction cups 86 and mechanical grippers 88 provides another important feature of the invention. If a missblow occurs and the parison is not blown within the mold cavity, the grippers 82 will still pick up the parison and transfer it out of the mold assembly up to the hand off station 73. At the hand off station, the rotary head assembly has only the vacuum cups 120 which cannot grasp a missblown parison. Therefore, when grippers 88 release the parison, the parison drops downwardly and falls onto a slide plate 140 which directs the parison away from wheel 22 and allows it to exit the machine 20 without causing any handling or jamming problems.

The invention may be embodied in other specific forms without departing from the spirit or essential characteristics thereof The present embodiments are, therefor, to be considered in all respects as illustrative and not restrictive, the scope of the invention being indicated by the appended claims rather than by the foregoing description, and all changes which come within the meaning and range of equivalency of the claims are therefor intended to be embraced therein.

What is claimed is:

1. A rotary blow molding machine comprising a frame, a wheel rotatably mounted on said frame, a plurality of mold assemblies mounted on said wheel in circumferentially spaced apart relation, each of said mold assemblies being openable to expose a finished workpiece as said mold assembly moves through a workpiece discharge station, a take-out assembly for removing a finished workpiece from a mold assembly as said mold assembly moves through said discharge station, said take-out assembly including a first transfer mechanism mounted adjacent said discharge station and including a first pick-up unit for grasping a finished workpiece and moving it in a substantially linear direction away from said wheel to a transfer station, a second transfer mechanism mounted at said transfer station for receiving a workpiece from said first pick-up unit and moving said workpiece to an exit station as said first pick-up unit returns to said discharge station to pick up another finished workpiece from said wheel.

2. The rotary blow molding machine of claim 1, wherein said second transfer mechanism is rotatably mounted so as to move a workpiece from a first orientation at said first pick-up unit to a second orientation at said exit station.

3. The rotary blow molding machine of claim 2, wherein said first pick-up unit moves generally radially upwardly away from said wheel.

4. A rotary blow molding machine comprising a frame, a wheel mounted on said frame for rotation about a horizontal axis, a plurality of mold assemblies mounted on said wheel in circumferentially spaced apart relation, each of said mold assemblies being openable to expose a finished workpiece as said mold assembly moves through a workpiece discharge station, a take-out assembly for removing a finished workpiece from a mold assembly as said mold assembly moves through said discharge station, said take-out assembly including a first transfer mechanism mounted adjacent said discharge station and including a first pick-up unit for grasping a finished workpiece and moving it in a substantially linear direction away from said wheel to a transfer station, a second transfer mechanism mounted at said transfer station for receiving a workpiece from said first pick-up unit and moving said workpiece to an exit station as said first pick-up unit returns to said discharge station to pick up another finished workpiece from said wheel.

5. The rotary blow molding machine of claim 4, wherein said second transfer mechanism rotates about an axis generally parallel to said horizontal axis of said wheel so as to move a workpiece from a first orientation at said transfer station to a second orientation at said exit station.

6. The rotary blow molding machine of claim 5, wherein said first pick-up unit moves generally radially upwardly away from said wheel.

7. The rotary blow molding machine of claim 6, wherein said first pick-up unit places said workpiece in a bottom up orientation at said transfer station and said second transfer mechanism rotates said workpiece to a bottom down position at said exit station.

8. A rotary blow molding machine comprising a frame, a wheel mounted on said frame for rotation about a horizontal axis, a plurality of mold assemblies mounted on said wheel in circumferentially spaced apart relation, each of said mold assemblies being openable to expose a finished bottle as said mold assembly moves through a bottle discharge station, a take-out assembly for removing a finished bottle from a mold assembly as said mold assembly moves through said discharge station, said take-out assembly including a first transfer mechanism mounted adjacent said discharge station and including a first pick-up unit for grasping a finished bottle, moving said bottle in a substantially linear direction upwardly away from said wheel to a transfer station, and orienting said bottle from a substantially horizontal position at said discharge station to a substantially bottom up vertical position at said transfer station, a second transfer mechanism mounted at said transfer station for receiving said bottle from said first pickup unit and rotating said bottle to a bottom down upright position at an exit station as said first pick-up unit returns to said discharge station to pick up another finished bottle from said wheel.

9. A take-out assembly for removing bottles from a blow molding machine having a plurality of mold assemblies mounted on a rotatable wheel in circumferentially spaced apart relation, each of said mold assemblies being openable to expose a finished bottle as said mold assembly moves through a bottle discharge station, said take-out assembly including a first transfer mechanism mounted adjacent said discharge station and including a first pick-up unit for grasping a finished bottle, moving said bottle in a substantially linear direction away from said wheel to a transfer station, and orienting said bottle from a substantially horizontal position at said discharge station to a substantially bottom-up vertical position at said transfer station, a second transfer mechanism rotatably mounted at said transfer station for receiving said bottle for said first pick-up unit and rotating said bottle to a bottom-down upright position at an exit station as said first pick-up unit returns to said discharge station to pick up another finished bottle from said wheel.

* * * * *